(No Model.)

J. F. MUNSIE.
APPARATUS FOR HAULING THROUGH ELECTRIC CABLES.

No. 426,196.          Patented Apr. 22, 1890.

WITNESSES.

INVENTOR.
James F. Munsie.

By his Attorney.

UNITED STATES PATENT OFFICE.

JAMES FERGUSON MUNSIE, OF CHICAGO, ILLINOIS, ASSIGNOR TO THOMAS L. COLES, OF NEW YORK, N. Y.

APPARATUS FOR HAULING THROUGH ELECTRIC CABLES.

SPECIFICATION forming part of Letters Patent No. 426,196, dated April 22, 1890.

Application filed May 8, 1889. Serial No. 310,033. (No model.)

*To all whom it may concern:*

Be it known that I, JAMES FERGUSON MUNSIE, a subject of the Queen of Great Britain, residing at Chicago, in the county of Cook and State of Illinois, have invented certain new and useful Improvements in Hauling-Through Systems for Branch Conduits; and I do hereby declare the following to be a full, clear, and exact description of the invention, such as will enable others skilled in the art to which it appertains to make and use the same.

In a patent granted to me January 18, 1887, and numbered 356,153, I have described and claimed an underground conduit for electrical conductors, consisting of a main duct extending between man-holes and provided at its upper portion with a supplemental duct for the reception of a hauling-through cable or rope adapted for attachment to the electrical conductor, and having a trailing cable whereby, after being drawn from one man-hole to another, it may be returned for attachment to a second conductor.

The object of my present invention is to provide means for drawing an electrical conductor or conductors from the main duct or conduit into and through a branch duct or conduit leading to a house or other locality at either side of the main conduit.

Figure 1:
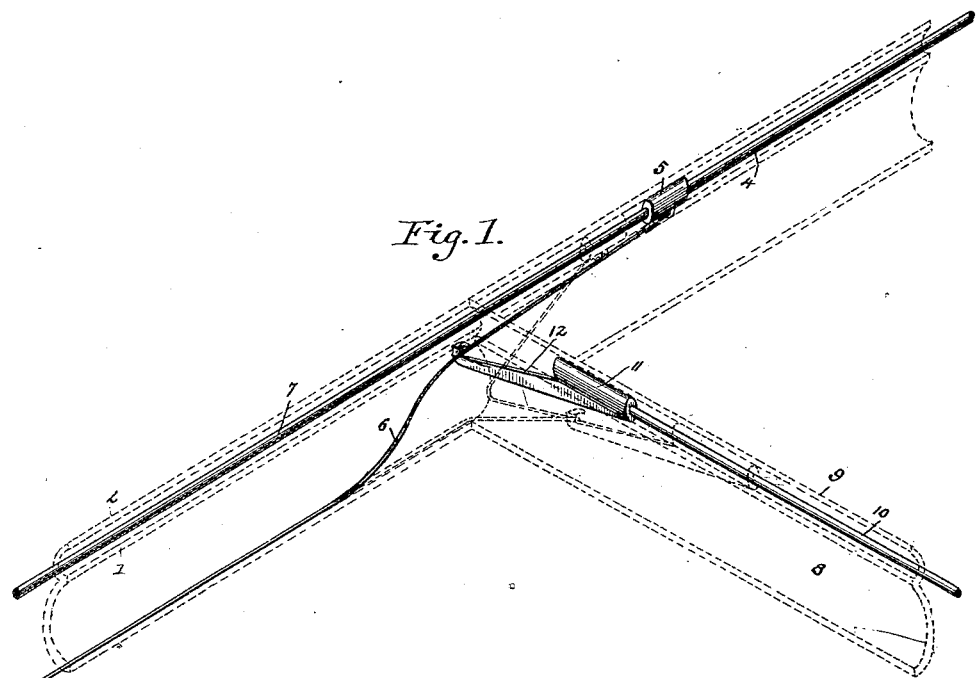
Figure 2:
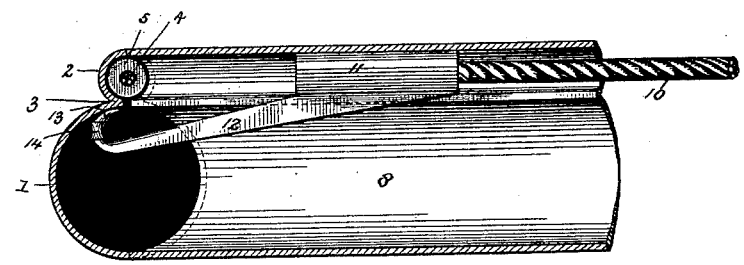

In the accompanying drawings, illustrative of my invention, Figure 1 represents in perspective the devices for manipulating the electrical conductors in the main and branch conduits, and also in dotted lines said figure illustrates a sectional view of the main and branch conduits. Fig. 2 represents a central longitudinal section of the branch conduit and a cross-section of the main conduit at their point of intersection, the hauling-through devices of the branch conduit being shown in side elevation.

Similar numerals of reference indicate similar parts throughout the several views.

Referring to the drawings, the main conduit consists of the main body portion or duct proper 1, provided with the supplemental hauling-through conduit or chamber 2, with which it communicates by means of a longitudinal slot 3. Within the supplemental chamber 2 is located the hauling-through cable 4, passing from man-hole to man-hole in the manner described in my patent above referred to.

At 5 is represented a suitable means of attachment for one of the ends of an electrical conductor, as 6, and 7 indicates a trailing cable serving as a follower during the progress of the electrical conductor from one man-hole to another, whereby the attachment-piece 5 and the cable 4 may be drawn back from the distant man-hole after the electrical conductor has been drawn through the duct or conduit 1.

As far as described the arrangement and construction of parts and their mode of operation are precisely similar to that set forth at length in my patent above referred to.

From point to point along the length of the main conduit 1 are located branch conduits for serving buildings or other localities along the line. One of these branch conduits is shown in the drawings, and consists of a main body portion 8 and a supplemental hauling-through duct or chamber 9, communicating, respectively, with the main body portion 1 and the hauling-through chamber 2 of the main conduit. The supplemental duct or chamber 9 is of a size sufficient to receive a stout wire or cable 10 having sufficient rigidity to remain straight while being passed into said duct from the house end of the branch conduit. In practice I have found a No. 4 copper wire well adapted to the purpose, although it will be evident that varying conditions may require or permit a greater or less size of wire for the purpose. At the end of the wire 10 proximate to the main conduit is connected in any suitable manner a sliding piece 11, provided with a downwardly-inclined dependent arm 12, having a return-bend 13, and preferably provided with a friction-roller 14, for purposes hereinafter to be described. That portion of the depending arm 12 which projects within the main body portion 1 of the main conduit is rounded off, as shown, upon its top and sides, so as to avoid abrasion of the insulating-covering of the electrical conductor with which it comes in contact in the operation of the invention.

The parts of the invention being constructed and arranged as described, the operation is as follows: When it is desired to draw into the branch conduit 8 an electrical conductor, said conductor is connected at one of the manholes of the main conduit-line with the connection 5 preparatory to being drawn toward the next man-hole, between which and the first is located the branch conduit to be served. Before drawing the electrical conductor through the section of the main conduit between the said man-holes the sliding piece 11 is inserted at the house end of the branch conduit and pushed inwardly by means of the rigid wire 10 or its equivalent until the depending arm 12 is advanced to the position indicated in full lines in Figs. 1 and 2, in which position the hooked portion 13 will be at the opposite side of the longitudinal slot 3 connecting the main and supplemental ducts of the main conduit. The electrical conductor, as 6, is now drawn through the main conduit in the manner prescribed by my patent above referred to until it passes the point of intersection of the branch and main conduits, as indicated in Fig. 1 of the drawings. In passing the said point of intersection the electrical conductor drops upon the end of the depending piece 12, and is protected from abrasion by the rounded surfaces of said projecting piece upon which it rests. The sliding piece 11 and its depending arm 12 are thereupon withdrawn through the supplemental chamber 9 of the branch conduit, and the hooked portion 13 of the depending arm engages with the electrical conductor, thus drawing it through the branch conduit in the manner indicated in dotted lines in Fig. 1, the conductor being drawn through in the form of a loop, as indicated in said figure, and during its progress through the branch conduit 8 being protected from abrasion by means of the friction-roller 14. When the loop has been drawn entirely through the branch conduit, it may either be severed at the house end of said branch conduit and that portion which is connected with the piece 5 drawn back and out through the main conduit by means of the hauling-through cable, or before severing the inner end of the loop said end may be retained in engagement with the hook 13 of the depending arm, and by means of the hauling-through cable 4 the conductor may then be drawn onward to the next man-hole, whereupon the loop may be severed as before and the work inserted between the severed portions of the loop, both portions of the loop in this instance remaining in the branch conduit.

I prefer, before drawing the loop into the branch pipe, to carry the electrical conductor for some distance beyond the point of intersection of the branch and main conduits, so as to leave a sufficient length of conductor beyond said point of intersection to readily form one side of said loop. In forming the loop the connecting-piece 5 and the hauling-through cable 4 will be preferably drawn back, thereby lessening the strain on the conductor and the arm 13. It is apparent that by fixing the hauling-through cable rigidly this retrograde movement thereof might be prevented and the loop formed entirely from that portion of the electrical conductor between the mouth of the branch conduit and the initial man-hole; but for most purposes the friction occasioned by this mode of operation would be undesirable.

It is evident that instead of attaching the electrical conductor to the connecting-piece 5 an ordinary rope might be attached thereto of a length corresponding to the length of the branch conduit. By this expedient, should it be desired merely to leave a single wire in the branch conduit without return, the expense of the severed portion in those instances where the wire is connected directly to the piece 5 would be avoided.

Having thus described my invention, what I claim is—

1. The combination, with a main conduit for electrical conductors, of a branch conduit and a traveling grapple or hook located within said branch conduit, and a way for supporting said grapple or hook during its forward and backward movements, substantially as described.

2. The combination, with a main conduit, of a branch conduit extending therefrom, said main and branch conduits being each provided with a supplemental duct or chamber, a hauling-through cable located in the supplemental duct of the main conduit, a hauling-through wire located in the supplemental duct of the branch conduit, and a hook or grapple connected to the end of said wire, substantially as described.

3. The combination, with a main conduit, of a branch conduit extending therefrom, said main and branch conduits being each provided with a supplemental duct or chamber, a hauling-through cable located in the supplemental duct of the main conduit, a hauling-through wire located in the supplemental duct of the branch conduit, and a hook or grapple connected to the end of said wire, said hook or grapple having rounded surfaces, so as to prevent abrasion of the insulating-covering of the electrical conductors, substantially as described.

4. The combination, with a main conduit, of a branch conduit extending therefrom, said main and branch conduits being each provided with a supplemental duct or chamber, a hauling-through cable located in the supplemental duct of the main conduit, a hauling-through wire located in the supplemental duct of the branch conduit, a hook or grapple connected to the end of said wire, said hook or grapple having rounded surfaces, so as to prevent abrasion of the insulating-covering of the electrical conductors, and a friction-roller at the outer end of said hook or grapple, substantially as described.

5. The combination, with the main conduit 1, having a supplemental chamber 2 extending longitudinally therewith along its upper portion, of a branch conduit 8, having a like supplemental chamber 9, a hauling-through cable 4, located within the main supplemental chamber 2, attachment-piece 5, connected to said hauling-through cable, trailing rope 7, connected with said attachment-piece and located within the main supplemental chamber 2, and a wire 10 and sliding piece 11, located within the branch supplemental chamber 9, said sliding piece 11 having a depending arm 12, terminating in a hook-shaped projection 13, substantially as described.

6. The combination, with the main conduit 1, having supplemental chamber 2, of a branch conduit 8, having supplemental chamber 9, a hauling-through cable 4, its attachment-piece 5, a trailing rope 7, wire 10, and sliding piece 11, having a dependent arm 12, terminating in a hook-shaped projection 13, said hook-shaped projection having rounded surfaces and being provided with a friction-roller 14, substantially as described.

In testimony whereof I affix my signature in presence of two witnesses.

JAMES FERGUSON MUNSIE.

Witnesses:
HERBERT MUNSIE,
A. C. REYNOLDS.